(12) United States Patent
Carnemark et al.

(10) Patent No.: US 11,296,546 B2
(45) Date of Patent: Apr. 5, 2022

(54) SYSTEMS AND METHODS FOR SUPPLYING UNINTERRUPTIBLE POWER

(71) Applicant: Inertech IP LLC, Plano, TX (US)

(72) Inventors: Jakob Carnemark, Fairfield, CT (US); Robert S. Stone, Youngsville, NC (US)

(73) Assignee: Inertech IP LLC, Plano, TX (US)

( * ) Notice: Subject to any disclaimer, the term of this patent is extended or adjusted under 35 U.S.C. 154(b) by 0 days.

(21) Appl. No.: 16/653,988

(22) Filed: Oct. 15, 2019

(65) Prior Publication Data

US 2020/0227939 A1 Jul. 16, 2020

Related U.S. Application Data

(60) Provisional application No. 62/745,465, filed on Oct. 15, 2018.

(51) Int. Cl.
*H02J 9/08* (2006.01)
*H02J 9/06* (2006.01)

(52) U.S. Cl.
CPC ............... *H02J 9/08* (2013.01); *H02J 9/062* (2013.01)

(58) Field of Classification Search
CPC ........ H02J 9/066; H02J 2310/10; H02J 9/062; H02J 9/08; H02J 3/38
See application file for complete search history.

(56) References Cited

U.S. PATENT DOCUMENTS

| | | | |
|---|---|---|---|
| 8,200,990 B2 | 6/2012 | Dishman et al. | |
| 9,342,414 B1 | 5/2016 | Nguyen et al. | |
| 9,698,589 B1 | 7/2017 | Leyh | |
| 9,705,360 B2 | 7/2017 | Kolhatkar et al. | |
| 10,025,337 B2 | 7/2018 | Hancock et al. | |
| 2005/0200205 A1* | 9/2005 | Winn | H02J 9/08 307/64 |
| 2012/0074794 A1 | 3/2012 | Morales et al. | |
| 2012/0275084 A1 | 11/2012 | Familiant et al. | |
| 2014/0157008 A1 | 6/2014 | Ammu et al. | |
| 2014/0208130 A1 | 7/2014 | Morales et al. | |
| 2017/0294782 A1 | 10/2017 | Navarro | |
| 2019/0173313 A1* | 6/2019 | Giuntini | H02H 7/20 |
| 2019/0258212 A1* | 8/2019 | Morton | H02J 3/38 |

FOREIGN PATENT DOCUMENTS

EP 2442417 A1 4/2012

* cited by examiner

*Primary Examiner* — Jared Fureman
*Assistant Examiner* — Duc M Pham
(74) *Attorney, Agent, or Firm* — Weber Rosselli & Cannon LLP

(57) ABSTRACT

Electrical systems for providing uninterruptible power to a critical load. One electrical system includes a ring bus, multiple power blocks including one or more generators electrically coupled to the ring bus, and uninterruptible power supplies (UPSs) electrically coupled to the ring bus. In some aspects, the electrical system includes a UPS switchgear electrically coupled between the ring bus and the UPSs. In other aspects, the UPSs are electrically coupled together in parallel. Another electrical system includes a utility switchgear, UPS blocks electrically coupled together in parallel and electrically coupled to the utility switchgear via transformers, low voltage (LV) power blocks electrically coupled to the UPS blocks, and medium voltage (MV) switchgear electrically coupled to the UPS blocks via transformers. Each of the LV power blocks include one or more generators.

16 Claims, 9 Drawing Sheets

SYSTEMS AND METHODS FOR SUPPLYING UNINTERRUPTIBLE POWER

BACKGROUND

Many industries, such as the financial, medical, communications, and cloud storage industries, require an uninterruptible supply of electrical power. Uninterruptible power supply systems have been designed to handle critical loads of those industries during brief periods when service from a main power supply (e.g., a utility) becomes "interrupted".

SUMMARY

In one aspect, this disclosure features an electrical system. The electrical system includes a ring bus. The electrical system also includes first generators individually and electrically coupled to the ring bus. The electrical system also includes a power block including second generators coupled to the ring bus. The electrical system also includes uninterruptible power supplies (UPSs) electrically coupled in parallel. The UPSs are electrically coupled to the ring bus. The electrical system also includes a UPS switchgear electrically coupled to the ring bus and to the UPSs.

In aspects, implementations of this disclosure may include one or more of the following features. Each of the UPSs may include an AC/DC converter, a DC/AC converter electrically coupled to the AC/DC converter, and an energy storage device electrically coupled to the DC/AC converter and the AC/DC converter. The UPS switchgear may be a power electronic switch (PES) switchgear that may be electrically coupled in parallel with the UPSs. At least one of the first generators may be a medium voltage (MV) generator, which may be directly coupled to the ring bus. At least one of the first generators may be a low voltage (LV) generator, which may be coupled to the ring bus via a step-up transformer. The second generators may be medium voltage (MV) generators, which may be coupled to the ring bus via a step-up transformer.

The first generators may include two to three megawatt (MW) MV generators and two to three MW LV generators. The second generators may include four to six MV generators. The electrical system may also include a utility switchgear electrically coupled to the ring bus and the UPSs. The electrical system may also include MV switchgear electrically coupled to the utility switchgear and the UPSs. The electrical system may also include LV switchgear electrically coupled to the MV switchgear via stepdown transformers. The electrical system may also include switchboards electrically coupled to the LV switchgear. The electrical system may also include a static transfer switch electrically coupled to the switchboards. The electrical system may also include a first power distribution unit electrically coupled to the static transfer switch. The electrical system may also include a second power distribution unit electrically coupled to one of the switchboards.

In another aspect, this disclosure features an electrical system. The electrical system includes a utility switchgear. The electrical system also includes uninterruptible power supply (UPS) blocks electrically coupled together in parallel. The UPS blocks are electrically coupled to the utility switchgear via first transformers, respectively. The electrical system also includes low voltage (LV) power blocks electrically coupled to the UPS blocks, respectively. The electrical system also includes medium voltage (MV) switchgear electrically coupled to the UPS blocks via second transformers.

In aspects, implementations of this disclosure may include one or more of the following features. At least one of the LV power blocks includes LV generators. At least one of the UPS blocks includes UPSs electrically coupled together in parallel. The electrical system may also include MV switchgear electrically coupled to the utility switchgear and the UPSs. The electrical system may also include LV switchgear electrically coupled to the MV switchgear via stepdown transformers. The electrical system may also include mechanical switchboards electrically coupled to the LV switchgear. The electrical system may also include information technology (IT) switchboards electrically coupled to the LV switchgear. The electrical system may also include a UPS coupled to a first IT switchboard of the IT switchboards. The electrical system may also include a first power distribution unit electrically coupled to the UPS. The electrical system may also include a second power distribution unit electrically coupled to a second IT switchboard of the IT switchboards. Each of the mechanical switchboards may be configured to supply power to at least one chiller and at least one coolant distribution unit.

In another aspect, this disclosure features an electrical system. The electrical system includes a utility switchgear. The electrical system also includes a ring bus electrically coupled to the utility switchgear. The electrical system also includes power blocks electrically coupled to the ring bus. The electrical system also includes an uninterruptible power supply (ups) switchgear electrically coupled to the utility switchgear and the ring bus. The electrical system also includes a ups container coupled to the ups switchgear. The electrical system also includes a power electronic switch (PES) switchgear electrically coupled to the UPS switchgear.

In aspects, implementations of this disclosure may include one or more of the following features. The UPS container includes inverter and chopper blocks. The electrical system may also include energy storage devices electrically coupled to each of the inverter and chopper blocks. The electrical system may also include a multi-tap step-up transformer electrically coupled between the UPS switchgear and the inverter and chopper blocks. The UPS container includes UPSs coupled together in parallel. Each of the UPSs may include an AC/DC converter, a DC/AC converter electrically coupled to the AC/DC converter, and an energy storage device electrically coupled to the DC/AC converter and the AC/DC converter. The electrical system may also include MV switchgear electrically coupled to the utility switchgear and the UPS switchgear. The electrical system may also include LV switchgear electrically coupled to the MV switchgear via stepdown transformers. The electrical system may also include mechanical switchboards electrically coupled to the LV switchgear. The electrical system may also include information technology (IT) switchboards electrically coupled to the LV switchgear.

The electrical system may also include static transfer switches coupled to the IT switchboards. The electrical system may also include power distribution units electrically coupled to the static transfer switches, respectively. The electrical system may also include busways electrically coupled to the power distribution units, respectively, and configured to supply power to servers. The electrical system may also include MV switchgear electrically coupled to the utility switchgear and the UPS switchgear. The electrical system may also include LV switchgear electrically coupled to the my switchgear via stepdown transformers. The electrical system may also include switchboards electrically coupled to the LV switchgear. The electrical system may also include a static transfer switch electrically coupled to the switchboards. The electrical system may also include a first power distribution unit electrically coupled to the static transfer switch. The electrical system may also include a second power distribution unit electrically coupled to one of the switchboards.

BRIEF DESCRIPTION OF THE DRAWINGS

Various aspects and features of this disclosure are described hereinbelow with references to the drawings, of which.

DETAILED DESCRIPTION

Figure 1A:
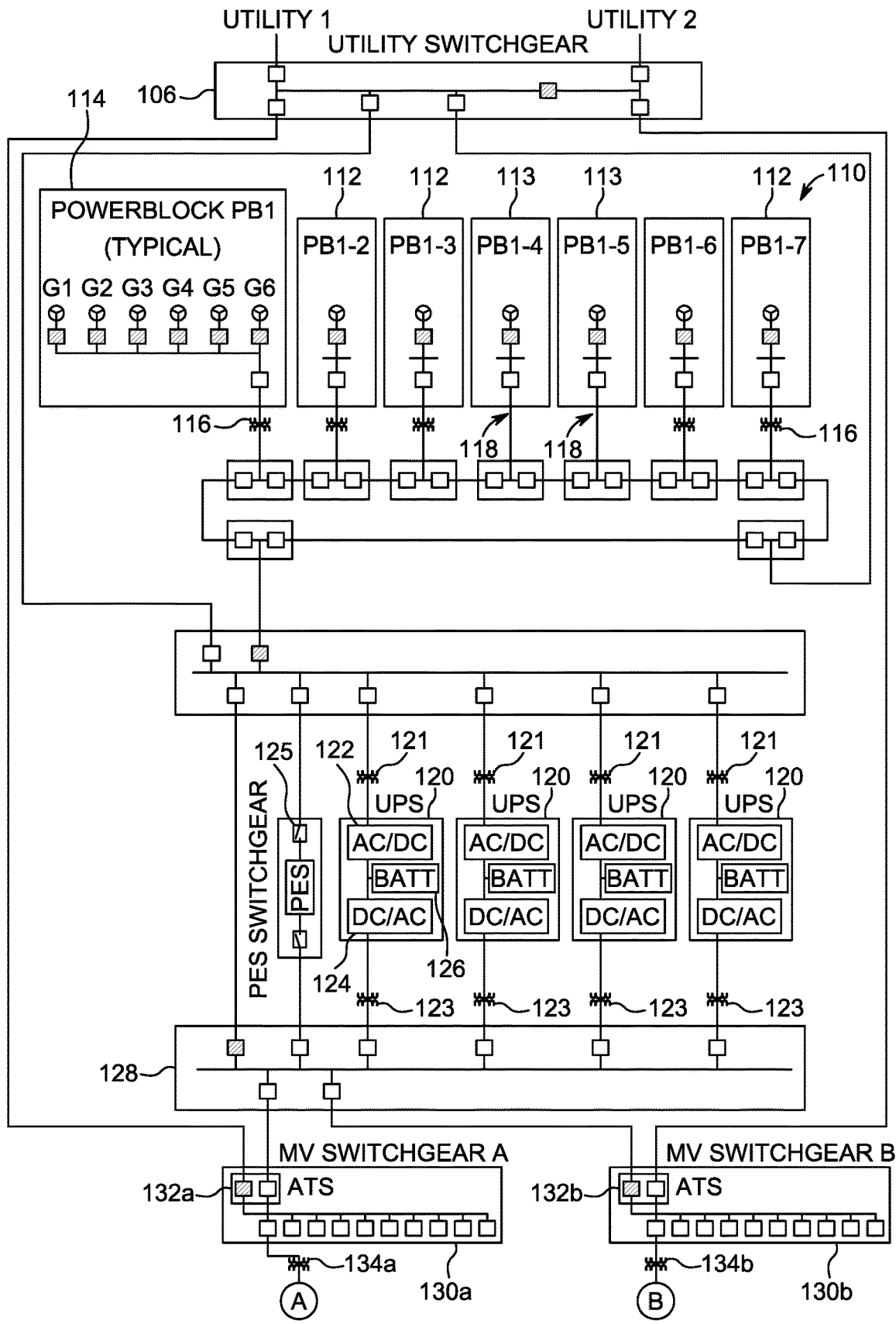
FIGS. 1A and 1B are schematic diagrams illustrating a datacenter electrical system including low-voltage (LV) uninterruptible power supplies (UPSs) in parallel and a generator ring bus on the outside portion of the datacenter electrical system in accordance with an aspect of this disclosure.

Aspects of this disclosure are now described in detail with reference to the drawings in which like reference numerals designate identical or corresponding elements in each of the several views. Throughout this description, the phrase "in aspects" and variations on this phrase generally is understood to mean that the particular feature, structure, system, or method being described includes at least one iteration of the disclosed technology. Such phrase should not be read or interpreted to mean that the particular feature, structure, system, or method described is either the best or the only way in which the aspect can be implemented. Rather, such a phrase should be read to mean an example of a way in which the described technology could be implemented but need not be the only way to do so.

Figure 1B:
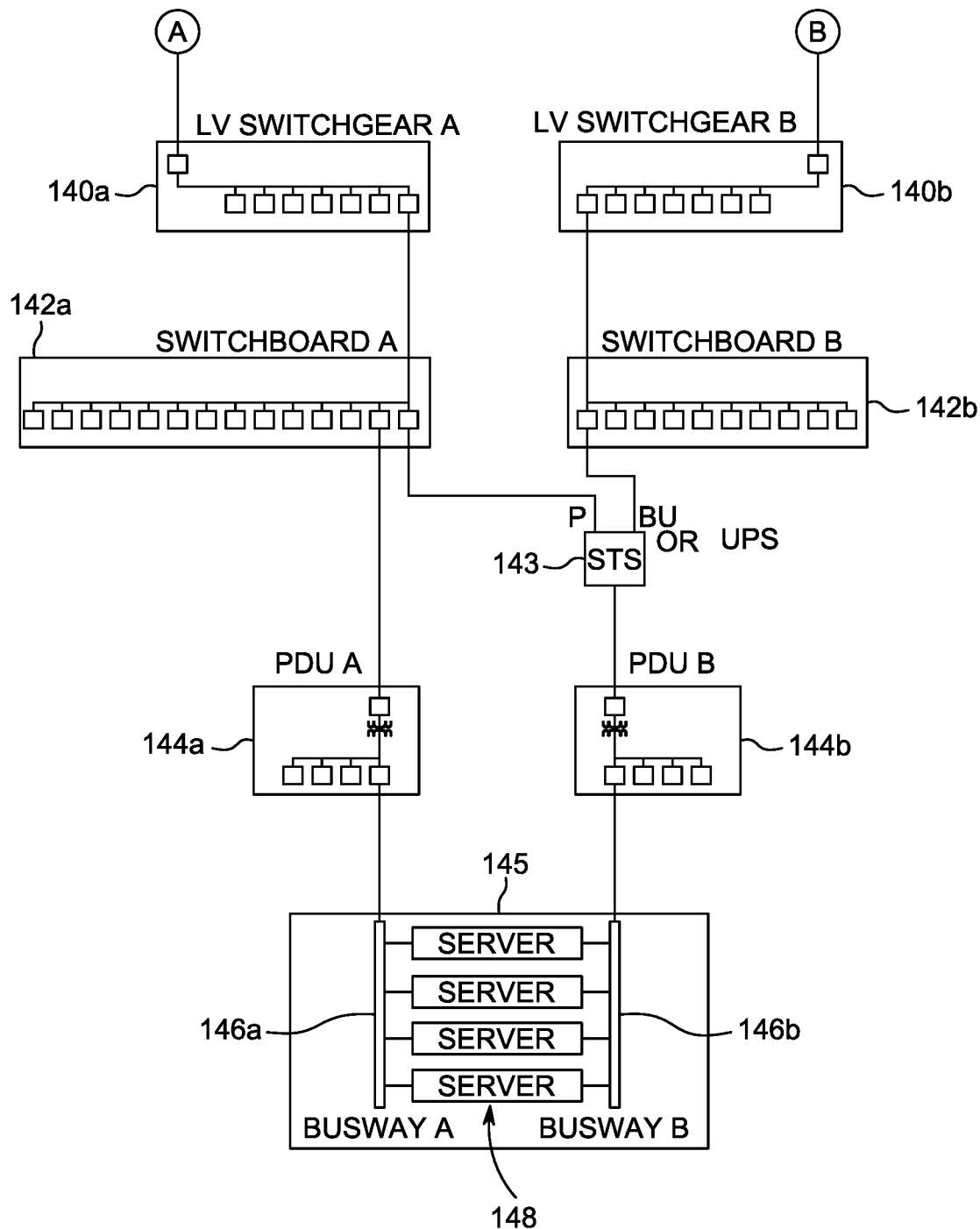

FIGS. 1A and 1B show schematic diagrams illustrating an electrical system including low voltage (LV) UPSs 120 arranged in parallel and a medium voltage (MV) generator ring bus 110 on the outside portion of the electrical system in accordance with an aspect of this disclosure. The MV generator ring bus 110 combines electrical generators (e.g., generators that generate electricity using fossil fuels) into a single generator system with no single point of failure. A fault may occur at any one location on the MV generator ring bus 110, but the electrical system will remain fully functional to supply power to servers 148 of a server rack assembly 145. Combining the electrical generators, e.g., the electrical generators of the power blocks 112, 113, 114, into a single system ahead of the LV UPSs 129 simplifies the control system and reduces points of failure compared to conventional systems.

The MV generator ring bus 110 may use any combination of the following:
- LV power blocks 114 with multiple LV generators (e.g., 4-6 LV generators) per power block and step-up transformers 116, which step-up the low voltage output from each of the LV power blocks 114 to a medium voltage.
- MV power blocks (not shown) with multiple MV generators (e.g., 4-6 MV generators) per MV power block but used without transformers.
- LV power blocks 112 (e.g., 2 or 3 MW LV power blocks, each of which include a single LV generator) used with step-up transformers 116.
- MV power blocks 113 (e.g., 2 or 3 MW MV power blocks, each of which include a single MV generator) used without transformers 118.

The electrical system further includes LV UPSs 120 arranged in parallel. The LV UPSs 120 are electrically coupled to the utility switchgear 106 and to the MV generator ring bus 110 via step-down transformers 121. The low-voltage output of the LV UPSs 120 is stepped up to a medium voltage via the step-up transformers 123.

The LV UPSs 120 are double-conversion UPSs with no individual static bypass switch or individual bypass breakers. Each LV UPS 120 includes an AC/DC converter 122 electrically coupled to a battery 126, which may be one or more lead-acid or lithium-ion batteries or other energy storage devices suitable for supplying power during an interruption, and a DC/AC converter 124 electrically coupled to the AC/DC converter 122 and the battery 126. The LV UPSs 120 may further include system bypass breakers for maintenance purposes. The LV UPSs 120 may be packaged in containers with, for example, a 2.4 MW UPS per container. If the LV UPSs 120 only operate in double conversion mode with no static bypass, they can use simple control systems such as a droop speed control system that includes a speed control mode for running the generators in parallel so that the load is shared among the generators in proportion to their power ratings without communication or single points of failure.

In aspects, there are various LV UPS 120 configurations. For example, the number of LV UPSs per transformer may be varied. For example, a single UPS (e.g., a single 1.2 MW UPS) may be deployed at each transformer (e.g., at each 1.2 MVA transformer), two UPSs (e.g., two 1.2 MW UPSs) may be combined at each transformer (e.g., at each 2.5 MVA transformer), or three UPSs (e.g., three 1.2 MW UPSs) may be combined at each transformer (e.g., at each 3.75 MVA transformer).

The control system of each LV UPS 120 may include a static switch to allow the LV UPS 120 to run in "offline" or "eco" modes. The static switch may be a power electronic switch (PES) manufactured by the S&C Electric Company or a static switch from an existing MV motor starter. Use of the static switch may improve the efficiency of the UPS portion of the system, for example, from around 94% to around 99% at a cost of around $1 M. With a load of 20 MW and an electricity cost of $0.10/kWh, the 5% improvement in efficiency would lead to a savings of approximately $876 K annually.

The static switch would not be a single point of failure because the UPS system can operate in double conversion mode without the static switch. There may be additional failure points in the control system that would need to be considered with respect to the operating cost savings.

In aspects, the UPSs 120 and transformers may be higher-voltage UPSs and transformers (e.g., 480 V or 575 V UPSs and transformers). The higher-voltage UPSs and transformers would reduce the copper needed for feeders which would reduce cost but may require non-standard transformers which could increase cost.

The electrical system of FIGS. 1A and 1B further includes MV switchgear 130a, 130b, each of which is electrically coupled to the utility switchgear 106 and to the UPS switchgear 128. The MV switchgear 130a, 130b include automatic transfer switches (ATS) 130a, 130b, which automatically switches from the power provided from the utility switchgear 106 to power provided from the UPS switchgear 106 when there is an interruption or a reduction in power from the utility switchgear 106.

The MV switchgear 130a, 130b of FIG. 1A each include multiple connection points for connecting to corresponding LV switchgear, e.g., LV switchgear 140a, 140b of FIG. 1B, which may be located on the inside of a facility, e.g., a data center facility. The MV switchgear 130a, 130b connect to the LV switchgear 140a, 140b, respectively, via stepdown transformers 134a, 134b. The LV switchgears 140a, 140b, in turn, include multiple connection points for connecting to multiple switchboards, e.g., switchboards 142a, 142b.

As shown in FIG. 1B, a connection point (which may be an appropriate connector) on each of switchboards 142a, 142b connects to power distribution unit (PDU) 144b via a static transfer switch (STS) 143, which uses power semiconductors as switching devices to transfer a load between the "A" and "B" sides of the electrical system. The PDU 144a is connected to switchboard 142a at a different connection point of the switchboard 142a. The PDUs 144a, 144b may each include a stepdown transformer for further stepping down from the low voltage output from the stepdown transformers 134a, 134b to a voltage suitable for powering server computers, e.g., servers 148 of the server rack assembly 145. In aspects, a facility may include multiple server rack assemblies similar to the server rack assembly 145. The PDUs 144a, 144b connect to busways 146a, 146b, respectively, for delivering power to the servers 148 of the server rack assembly 145. As illustrated in FIG. 1B, the PDUs 144a, 144b may each include multiple output connectors for connecting to other busways of other server rack assemblies (not shown), which may form part of a data center.

In aspects, a portion of the structures or components disposed outside of the facility, e.g., a building or a data-center facility, may be disposed within the facility and vice versa. For example, the MV switchgears 130a, 130b may be disposed within the facility or the LV switchgears 140a, 140b may be disposed outside of the facility.

Figure 2A:
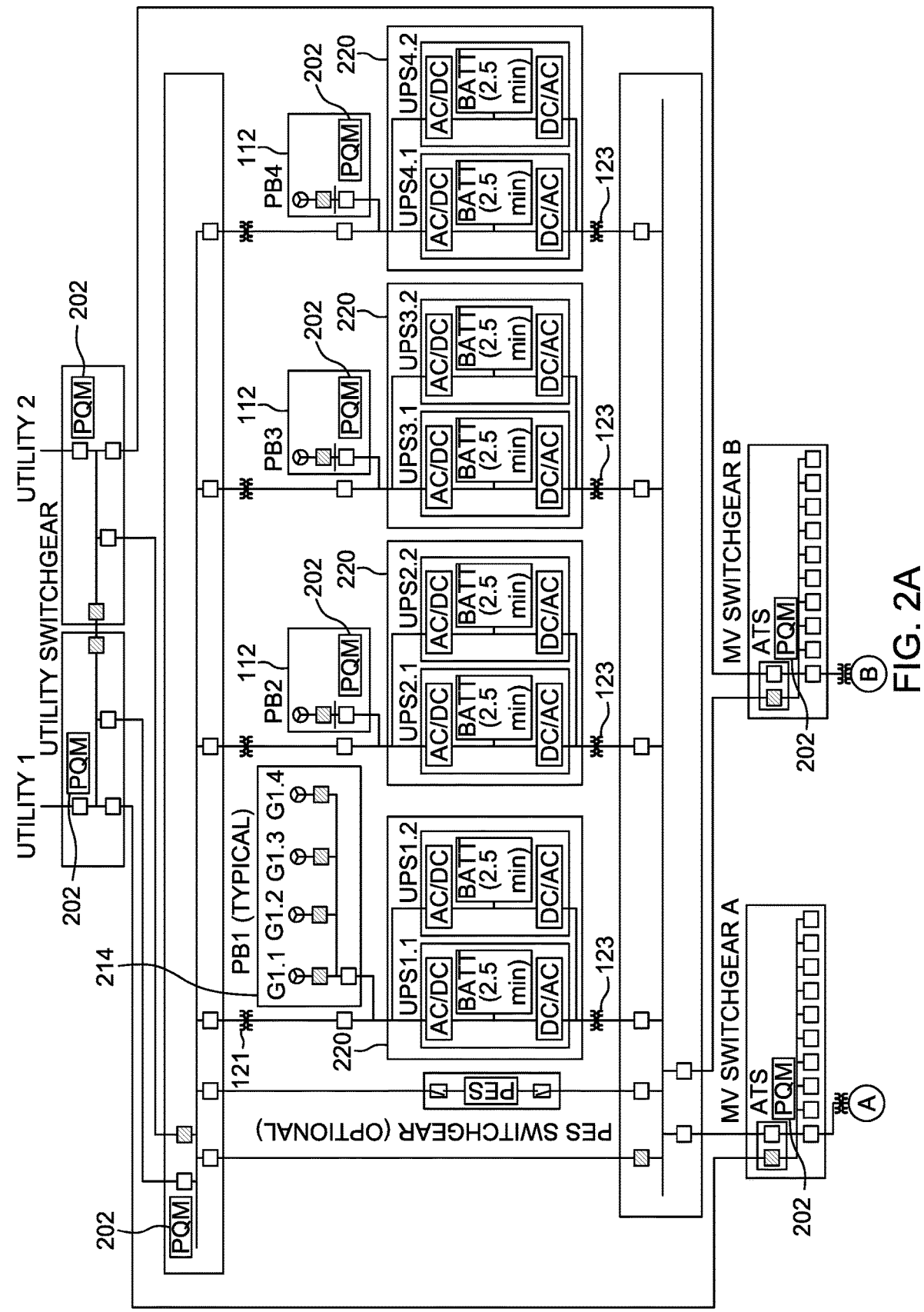
FIGS. 2A and 2B are schematic diagrams illustrating an electrical system including paralleled LV UPSs combined with LV generators on the outside portion of the datacenter electrical system in accordance with another aspect of this disclosure.
Figure 2B:
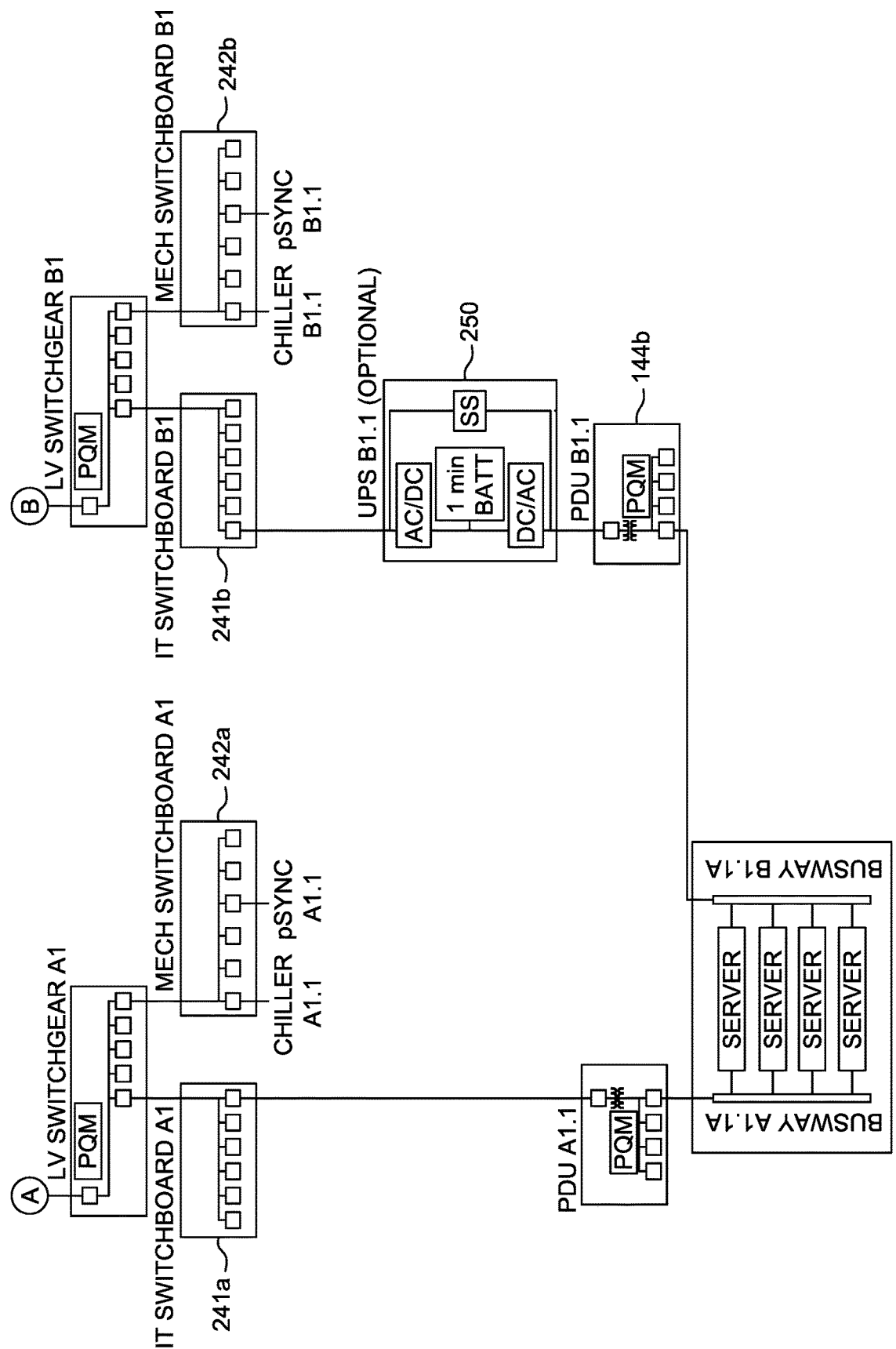

FIGS. 2A and 2B show schematic diagrams illustrating an uninterruptible electrical system including LV UPS blocks 220 in parallel and LV power blocks 112, 214, which include one or more electrical generators, on the outside portion of the uninterruptible electrical system in accordance with aspects of this disclosure. The outside portion of the uninterruptible electrical system shown in FIG. 2A is similar to the outside portion of the uninterruptible electrical system of FIG. 1A except that LV power blocks 112, 214 are connected to respective UPS blocks 220, each of which includes a pair of UPSs in parallel, between the stepdown transformers 121 and the step-up transformers 123. In aspects, the power blocks 112, 214 connected to each of the UPS blocks 220 may include 1-6 electrical generators per power block. The electrical generators may be 2-3 MW LV generators.

The uninterruptible electrical system of FIG. 2A combines the power blocks 112, 214 in proportional size to the transformers 121, 123 used with the UPS blocks 220. This avoids the cost and/or footprint of the generator ring bus 110 of FIG. 1A, shares the transformers 121, 123 with the UPS blocks 220, which further reduces the cost and/or footprint, and increases redundancy by providing a direct path to each UPS block 220 from an associated power block 112, 214. In the aspect of FIG. 2A, the transformers 121, 123 may be 2.5 MVA transformers or 3.75 MVA transformers.

A control system, which may be implemented by a computer associated with the electrical system, may be used to proportionally share the load between UPSs based on the number of generators available at the input, which would help maximize UPS runtime when all generators are not available. In aspects, the electrical system may include power quality meters 202 distributed throughout the electrical system to measure the performance of the electrical system. The power quality meters 202 may measure one or more of current, voltage, real and reactive power, energy use, cost of power, power factor, and frequency. The performance measurements may be used as feedback to control various portions of the electrical system to ensure, among other things, optimal and safe operation of the electrical system. Control functions based on the performance measurements, such as alarm on over or under current or voltage, may be implemented in a computer or control system associated with the electrical system.

FIG. 2B shows an inside portion of the uninterruptible electrical system that is similar to the inside portion illustrated in FIG. 1B, except that the switchboards 142a, 142b are each replaced by an IT switchboard 241a, 241b and a mechanical switchboard 242a, 242b, and a UPS 250 is disposed between the IT switchboard 241b and the PDU 144b. In aspects, the UPS 250 has a shorter battery backup capacity than the UPS blocks 220 to handle shorter power interruptions and keep the UPS blocks 220 fully charged for lengthier power interruptions. The mechanical switchboards include connection points for connecting to mechanical equipment such as cooling equipment, e.g., chillers and cooling distribution units as described, for example, in U.S. application Ser. No. 15/398,512, the entire contents of which are incorporated by reference herein.

Figure 3A:
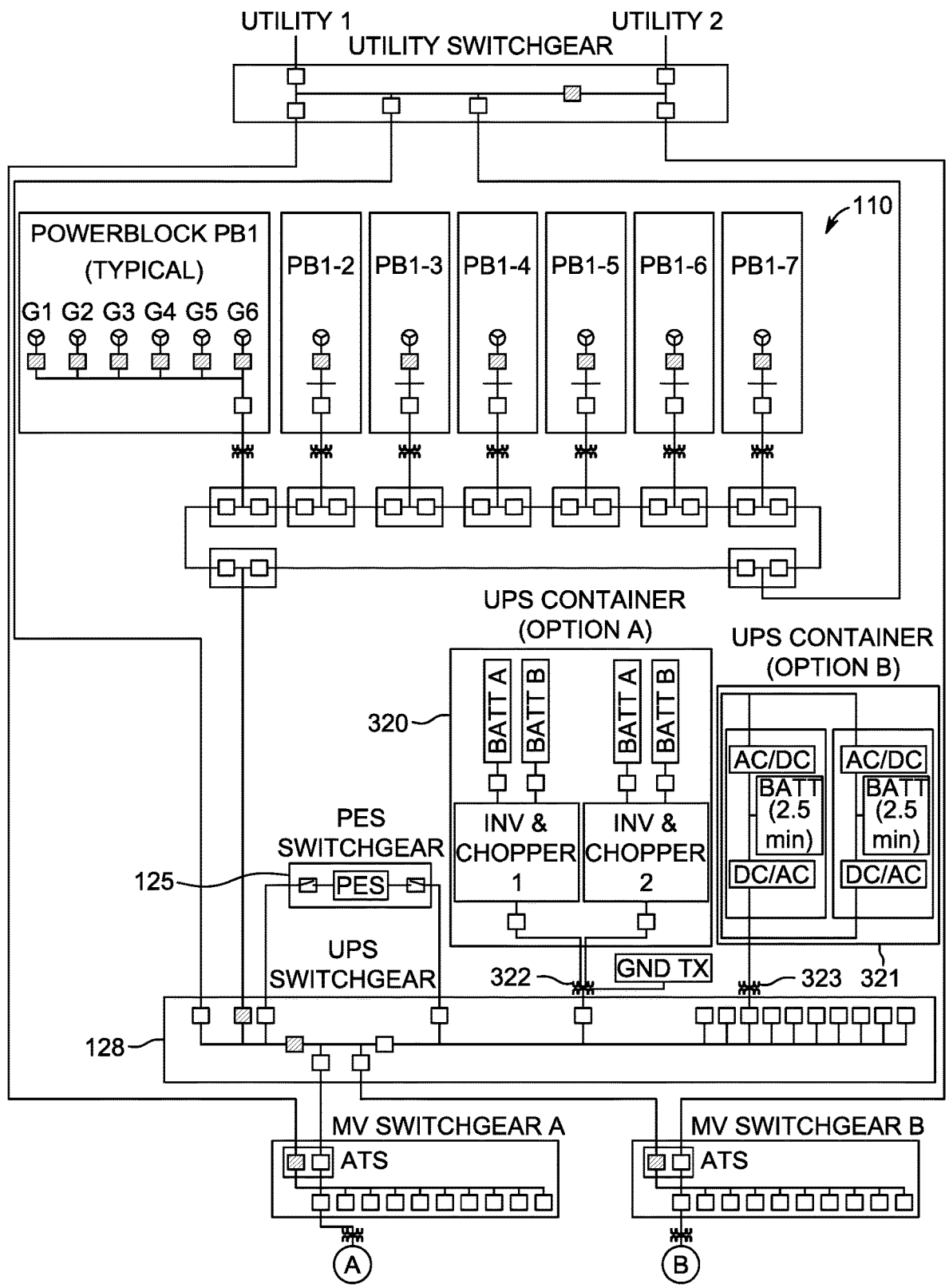
FIGS. 3A and 3B are schematic diagrams illustrating an electrical system including a MV generator ring bus with a MV UPS on the outside portion of the datacenter electrical system in accordance with still another aspect of this disclosure.
Figure 3B:
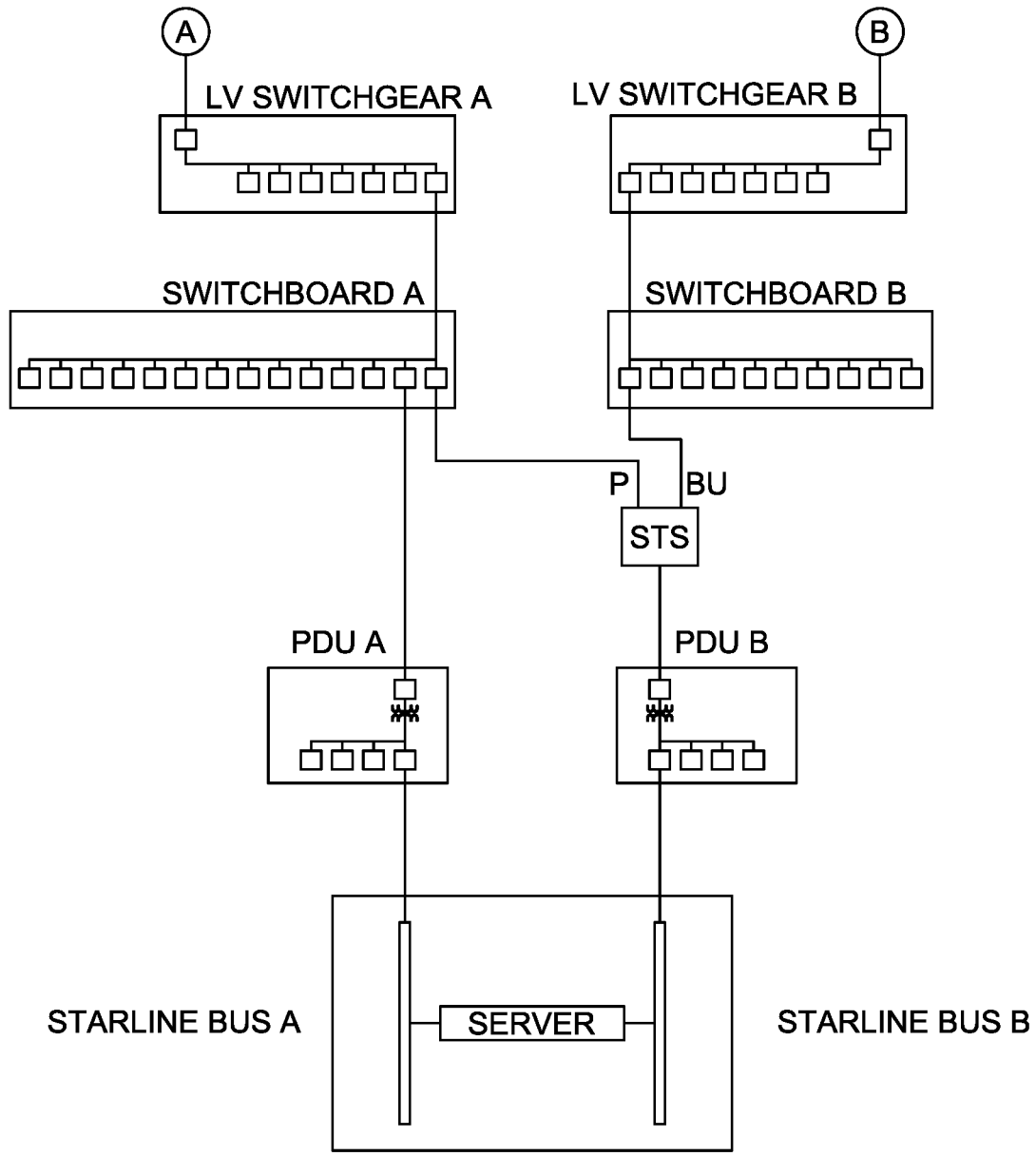

FIGS. 3A and 3B are schematic diagrams illustrating an electrical system including a MV generator ring bus and a MV UPS on the outside portion of the electrical system in accordance with aspects of this disclosure. The outside portion of the uninterruptible electrical system shown in FIG. 3A is similar to the outside portion of the uninterruptible electrical system of FIG. 1A except that the MV generator ring bus 110 is directly connected to the UPS switchgear 128, the PES switchgear 125 is connected between two connection points of the UPS switchgear 128, and the UPSs 120 are replaced by two different types of UPS containers 320, 321.

The aspect of FIGS. 3A and 3B improves on the cost and/or availability of equipment, and the ability to add inverter/battery containers without impacting the facility, the solid grounding, and the master control system. With the generator system combined into one on the generator ring bus 110, the process for running the site on generator to add inverter/battery containers is simplified.

As shown in FIG. 3A, the MV static switch may be the PES switchgear 125 or the static switch from an existing MV motor starter. The UPS container 320 may include a pair of inverter and chopper units and a pair of batteries connected to each of the inverter and chopper units. In other aspects, the UPS container 320 may include any number of inverter and chopper units and any number of corresponding batteries or other appropriate energy storage devices configured to supply power when there is an interruption in power supplied by one or more utilities.

The output voltage of the UPS container 320 may be stepped up to a medium voltage by the step-up transformer 322. The UPS container 321 may include a pair of UPSs coupled in parallel. The UPSs may be any double-conversion LV UPSs that may be integrated into the master control system. The output voltage of the UPS container 321 may also be stepped up to a medium voltage by the step-up transformer 323. The UPS containers 320, 321 may use existing MV variable frequency drive (VFD) products and may add battery storage. The inside portion shown in FIG. 3B is the same as the inside portion shown in FIG. 1B except that power is supplied to servers via a track busway, e.g., the Starline® track busway.

Figure 4:
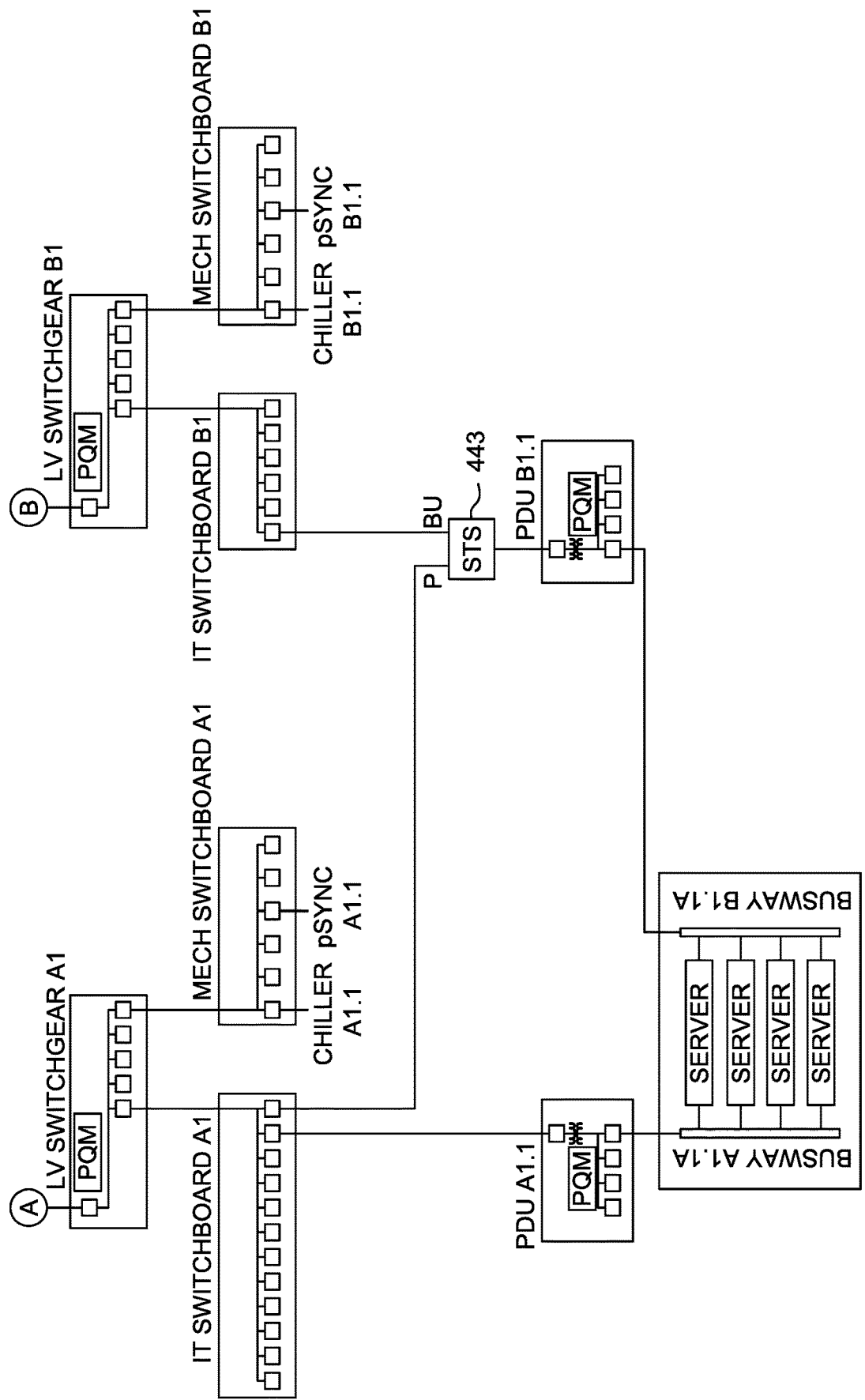
FIG. 4 is a schematic diagram illustrating an inside portion of an electrical system including a static transfer switch on one side in accordance with aspects of this disclosure.

FIG. 4 is a schematic diagram illustrating an inside portion of an electrical system including a static transfer switch 443 on one side (the "B" side) of the inside portion in accordance with aspects of this disclosure. The inside portion of FIG. 4 may be used with any of the outside portions illustrated in FIGS. 1A, 2A, and 3A and described herein. The inside portion of FIG. 4 is similar to the inside portion of FIG. 1B except that the switchboards 142a, 142b are each replaced by an IT switchboard 241a, 241b and a mechanical switchboard 242a, 242b shown in FIG. 2B.

Figure 5:
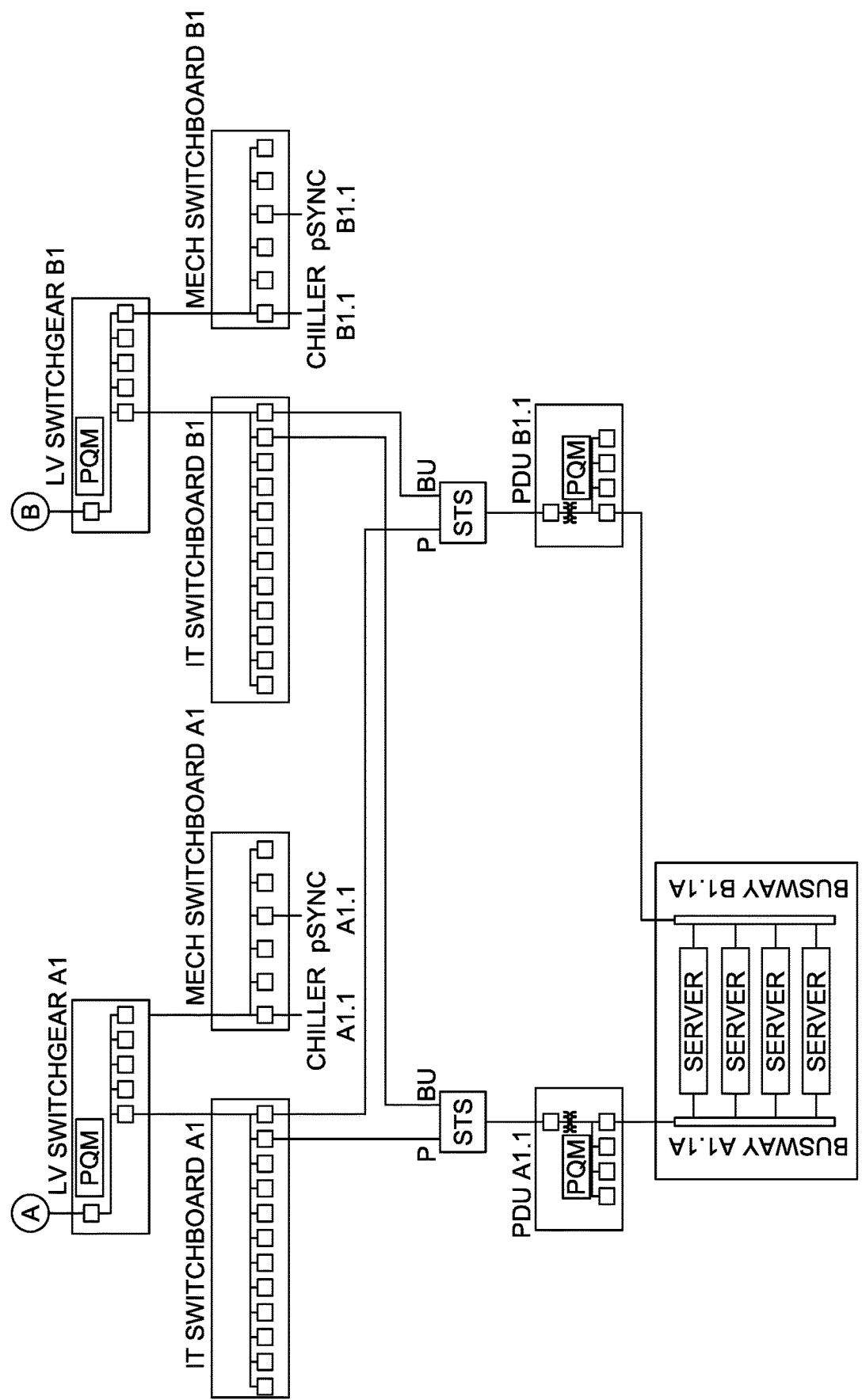
FIG. 5 is a schematic diagram illustrating an inside portion of an electrical system including a static transfer switch on both sides in accordance with aspects of this disclosure.

FIG. 5 is a schematic diagram illustrating an inside portion of an electrical system similar to the inside portion shown in FIG. 4 except that a static transfer switch is disposed on both sides, i.e., sides "A" and "B", in accordance with yet another aspect.

Figure 6:
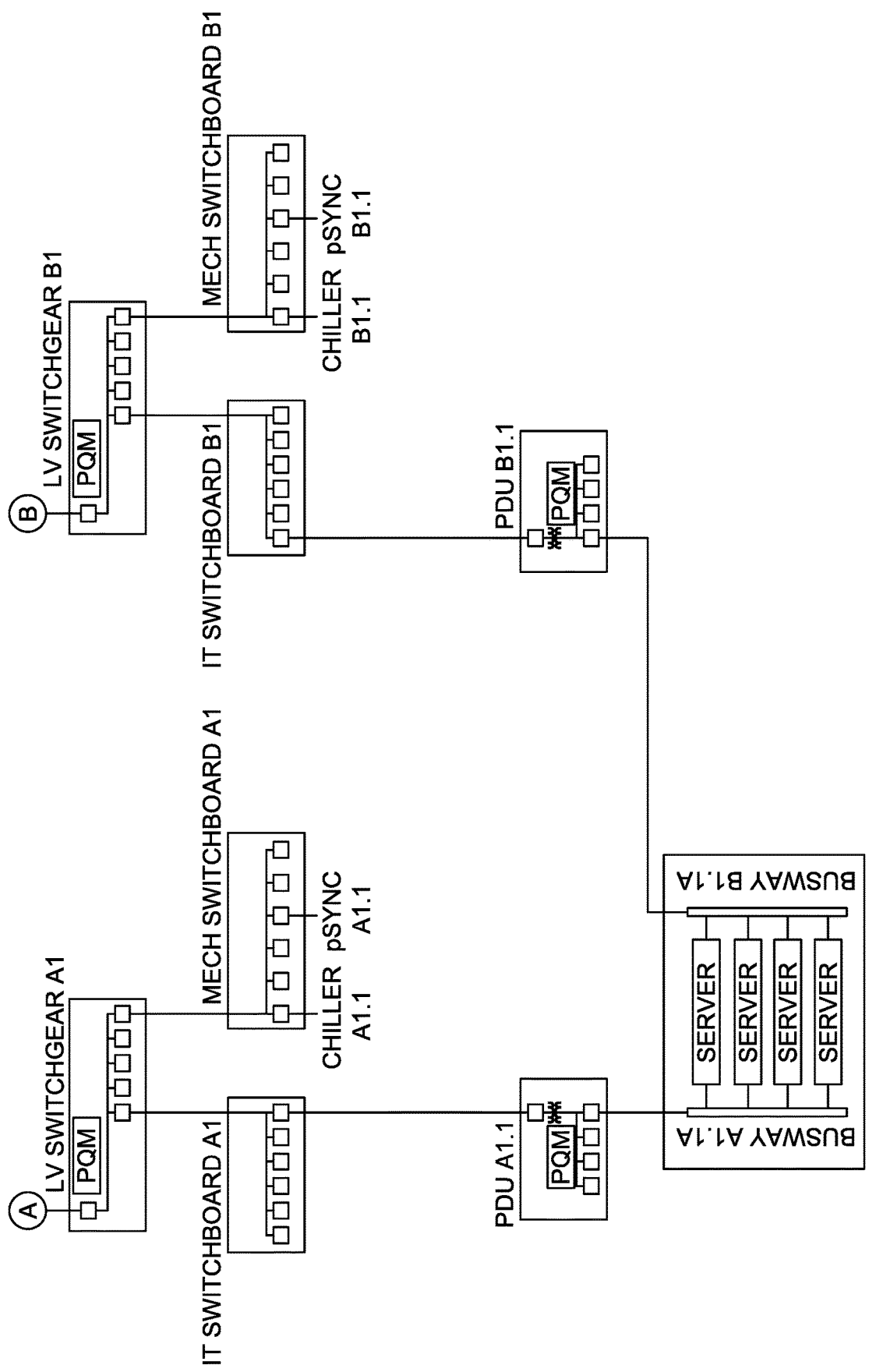
FIG. 6 is a schematic diagram illustrating an inside portion of an electrical system not including either an STS or a UPS in accordance with aspects of this disclosure.

FIG. 6 is a schematic diagram illustrating an inside portion of an electrical system not including either an STS or a UPS in accordance with yet another aspect.

While several aspects of the disclosure have been shown in the drawings, it is not intended that the disclosure be limited thereto, as it is intended that the disclosure be as broad in scope as the art will allow and that the specification be read likewise. Any combination of the above aspects is also envisioned and is within the scope of the appended claims. Therefore, the above description should not be construed as limiting, but merely as exemplifications of particular aspects. Those skilled in the art will envision other modifications within the scope and spirit of the claims appended hereto.

The invention claimed is:

1. An electrical system, comprising:
a ring bus;
a first plurality of generators individually and electrically coupled to the ring bus;
a power block including a second plurality of generators coupled to the ring bus;
a plurality of uninterruptible power supplies (UPSs) electrically coupled in parallel, the plurality of UPSs electrically coupled to the ring bus;
a UPS switchgear electrically coupled to the ring bus and to the plurality of UPSs;
a utility switchgear electrically coupled to the ring bus and the plurality of UPSs;
a plurality of MV switchgear electrically coupled to the utility switchgear and the plurality of UPSs;
a plurality of LV switchgear electrically coupled to the plurality of MV switchgear via a plurality of stepdown transformers;
a plurality of switchboards electrically coupled to the plurality of LV switchgear;
a static transfer switch electrically coupled to the plurality of switchboards;
a first power distribution unit electrically coupled to the static transfer switch; and
a second power distribution unit electrically coupled to one of the plurality of switchboards.

2. The electrical system of claim 1, wherein each of the plurality of UPSs include an AC/DC converter, a DC/AC converter electrically coupled to the AC/DC converter, and an energy storage device electrically coupled to the DC/AC converter and the AC/DC converter.

3. The electrical system of claim 1, wherein the UPS switchgear is a power electronic switch (PES) switchgear that is electrically coupled in parallel with the plurality of UPSs.

4. The electrical system of claim 1, wherein at least one of the first plurality of generators is a medium voltage (MV) generator, which is directly coupled to the ring bus.

5. The electrical system of claim 1, wherein at least one of first plurality of generators is a low voltage (LV) generator, which is coupled to the ring bus via a step-up transformer.

6. The electrical system of claim 1, wherein the second plurality of generators are medium voltage (MV) generators, which are coupled to the ring bus via a step-up transformer.

7. The electrical system of claim 1, wherein the first plurality of generators includes two to three megawatt (MW) MV generators and two to three MW LV generators.

8. The electrical system of claim 1, wherein the second plurality of generators include four to six MV generators.

9. An electrical system, comprising:
a utility switchgear;
a plurality of uninterruptible power supply (UPS) blocks electrically coupled together in parallel, the plurality of UPS blocks electrically coupled to the utility switchgear via a plurality of first transformers, respectively;
a plurality of low voltage (LV) power blocks electrically coupled to the plurality of UPS blocks, respectively; and
medium voltage (MV) switchgear electrically coupled to the plurality of UPS blocks via a plurality of second transformers.

10. The electrical system of claim 9, wherein at least one of the plurality of LV power blocks includes a plurality of LV generators.

11. The electrical system of claim 9, wherein at least one of the plurality of UPS blocks includes a plurality of UPSs electrically coupled together in parallel.

12. The electrical system of claim 9, further comprising:
a plurality of MV switchgear electrically coupled to the utility switchgear and the plurality of UPSs;
a plurality of LV switchgear electrically coupled to the plurality of MV switchgear via a plurality of stepdown transformers;
a plurality of mechanical switchboards electrically coupled to the plurality of LV switchgear;
a plurality of information technology (IT) switchboards electrically coupled to the plurality of LV switchgear;
a UPS coupled to a first IT switchboard of the plurality of IT switchboards;
a first power distribution unit electrically coupled to the UPS; and a second power distribution unit electrically coupled to a second IT switchboard of the plurality of IT switchboards.

13. The electrical system of claim 12, wherein each of the plurality of mechanical switchboards are configured to supply power to at least one chiller and at least one coolant distribution unit.

14. An electrical system, comprising:
a utility switchgear;
a ring bus electrically coupled to the utility switchgear;
a plurality of power blocks electrically coupled to the ring bus;
an uninterruptible power supply (UPS) switchgear electrically coupled to the utility switchgear and the ring bus;
a UPS container coupled to the UPS switchgear;
a power electronic switch (PES) switchgear electrically coupled to the UPS switchgear;
a plurality of MV switchgear electrically coupled to the utility switchgear and the UPS switchgear;
a plurality of LV switchgear electrically coupled to the plurality of MV switchgear via a plurality of stepdown transformers;
a plurality of mechanical switchboards electrically coupled to the plurality of LV switchgear;
a plurality of information technology (IT) switchboards electrically coupled to the plurality of LV switchgear;
a plurality of static transfer switches coupled to the plurality of IT switchboards;
a plurality of power distribution units electrically coupled to the plurality of static transfer switches, respectively; and
a plurality of busways electrically coupled to the plurality of power distribution units, respectively, and configured to supply power to a plurality of servers.

15. The electrical system of claim 14, wherein the UPS container includes:
a plurality of inverter and chopper blocks;
a plurality of energy storage devices electrically coupled to each of the plurality of inverter and chopper blocks; and
a multiple tap step-up transformer electrically coupled between the plurality of inverter and chopper blocks and the UPS switchgear.

16. The electrical system of claim 14, wherein the UPS container includes a plurality of UPSs coupled together in parallel, and
wherein each of the plurality of UPSs include an AC/DC converter, a DC/AC converter electrically coupled to the AC/DC converter, and an energy storage device electrically coupled to the DC/AC converter and the AC/DC converter.

* * * * *